Patented Oct. 21, 1952

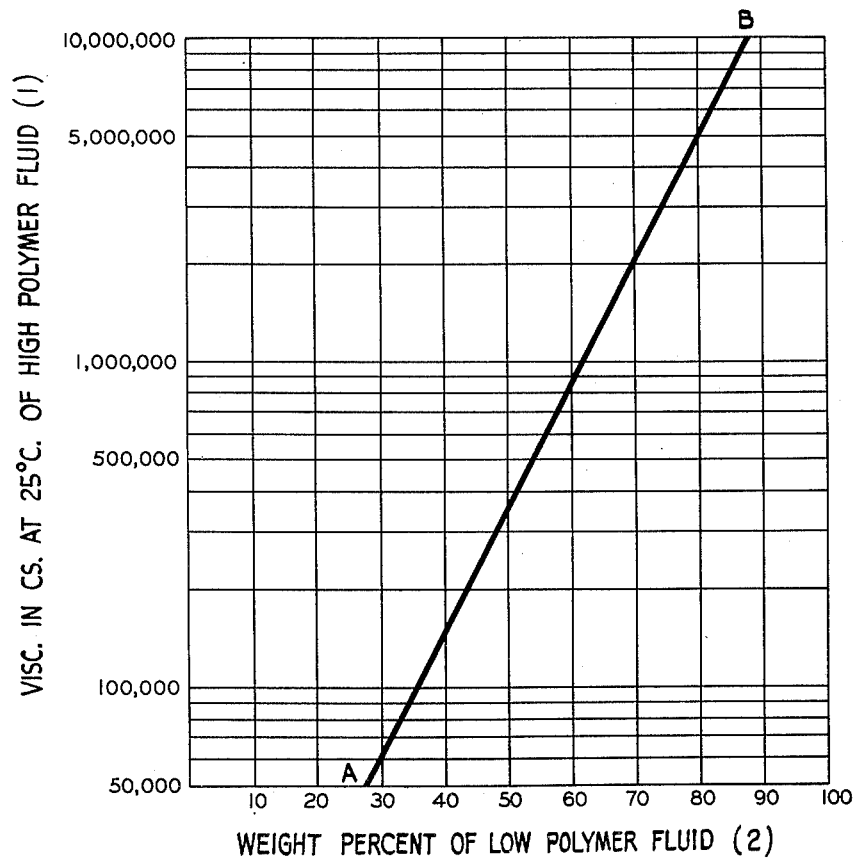

2,614,989

UNITED STATES PATENT OFFICE 2,614,989

HIGH VISCOSITY LOW FREEZING ORGANO-SILOXANE FLUIDS

Melvin J. Hunter and Herbert J. Fletcher, Midland, Mich., assignors to Dow Corning Corporation, Midland, Mich., a corporation of Michigan Application October 18, 1949, Serial No. 122,044

4 Claims. (Cl. 252—49.6)

This invention relates to blends of copolymeric siloxane fluids.

There is great need in many industrial and military applications for fluids which have freezing points at or below —56° C. and viscosities above 12,500 cs. Preferably such a fluid should have relatively small change in viscosity with variation in temperature.

High viscosity homopolymeric polysiloxane fluids such as dimethyl, diethyl, phenylmethylsiloxanes have freezing points of about —55° C. and above. It has been found that as the viscosity of these fluids is increased the freezing point also increases. Thus, a dimethylsiloxane fluid of 100 cs. viscosity has a freezing point of —55° C. while a fluid of 35,200 cs. viscosity freezes at —43.5° C. and a 1,000,000 cs. fluid freezes at —45.1° C. In general, homopolymeric siloxane fluids having other alkyl radicals and aryl groups substituted therein freeze at temperatures at or above the corresponding dimethyl fluids.

Low viscosity copolymeric fluids such as, for example, copolymers of phenylmethylsiloxane and dimethylsiloxane freeze somewhat lower than dimethylsiloxane fluids of equal viscosity. However, as with the homopolymeric fluids, these copolymers when polymerized to viscosities of 12,500 cs. or above have freezing points above —56° C. For example, a 28,000 cs. copolymer containing 6 mol percent phenylmethylsiloxane, the remainder being dimethylsiloxane, freezes at —43° C. and a 70,000 cs. copolymeric fluid having a composition of 6 mol percent diphenylsiloxane the rest being dimethylsiloxane freezes at —42° C. As the viscosity of these copolymers is increased, the freezing point also increases.

It is an object of this invention to prepare a siloxane fluid having a viscosity of at least 12,500 cs. and a freezing point below —56° C.

In accordance with this invention, a copolymeric polysiloxane fluid (1) having a viscosity of at least 50,000 cs. at 25° C. is blended with a copolymeric siloxane fluid (2) having a viscosity of from 20 cs. to 125 cs. at 25° C. The blend has a composition such that the weight percent of the low viscosity fluid (2) is at least 18 percent by weight based on the weight of the blend and lies to the left of the line AB in the accompanying drawing. The high viscosity fluid (1) has a composition of from 92 to 98 mol percent dimethylsiloxane and from 8 to 2 mol percent of siloxanes of the type RR'SiO where R is selected from the group alkyl radicals of from 1 to 4 carbon atoms and monocyclic aryl radicals and R' is selected from the group alkyl radicals of from 2 to 4 carbon atoms and monocyclic aryl radicals. The low viscosity fluid (2) has a degree of substitution of from 1.9 to 2.1 and a composition of from 80 to 98 mol percent dimethylsiloxane and 2 to 15 mol percent siloxane units of the type RR'SiO and R'SiO$_{1.5}$ where R is of the group consisting of alkyl radicals of from 1 to 4 carbon atoms and monocyclic aryl radicals and R' is of the group alkyl radicals having from 2 to 4 carbon atoms and monocyclic aryl radicals.

If desired, the copolymeric fluid (2) may also contain up to 10 mol percent triorganosiloxane units in which the organic radicals are alkyl radicals of 1 to 4 carbon atoms and monocyclic aryl radicals.

The blends of this invention are prepared by mixing the above defined copolymeric fluids. This mixing may be carried out in any suitable manner, but it has been found convenient to prepare the blend in a colloid mill. This is particularly true when the viscosity of the high polymer component is above 1,000,000 cs. The agitation is continued until a homogeneous material is obtained.

It is to be understood that the high viscosity component fluid (1) is not interacted with the low viscosity component fluid (2). The blends are solutions of the copolymers rather than intercondensates thereof.

At least 18 percent by weight based on the weight of the blend of the low viscosity component must be employed in order to produce a freezing point below —56° C. The upper limit of the amount of low viscosity fluid (2) that may be added varies with the viscosity of the high viscosity component (1). The maximum amount of low viscosity fluid (2) which may be added for any viscosity of (1) is shown by the line AB in the accompanying drawing.

The drawing is a graph in which the viscosity in centistokes at 25° C. of the high polymer fluid (1) is plotted on the vertical logarithmic scale while the weight percent of the low viscosity fluid (2) is plotted on the horizontal grid scale.

The line AB shows the amount of low viscosity component (2) which must be added to the high viscosity fluids to produce a blend of 12,500 cs. Thus, any amount of the low viscosity fluid which lies to the left of AB will produce a blend having a viscosity above 12,500 cs. However, in all cases there must be at least 18 percent by weight of the low viscosity fluid in order to produce a freezing point sufficiently low for the purposes of this invention.

For example, with a 50,000 cs. high viscosity fluid, the amount of low viscosity fluid which may be added in order to produce the blends of this invention ranges from 18 percent to 28 percent by weight of the blend. With a 1,000,000 cs. high component fluid the amount of fluid (2) which may be added is from 18 percent to 62 percent by weight of the blend.

The low viscosity fluids (2) employed in this invention range in viscosity from 20 to 125 cs. It should be understood that viscosity of the blend is not contingent upon the precise viscosity of the low polymer component. That is, a blend say of a 2,000,000 cs. fluid with a 20 cs. fluid will have essentially the same viscosity as a blend of a 2,000,000 cs. fluid with a 125 cs. fluid, if the proportions of the ingredients are the same in both cases.

The low polymer fluids may be prepared by cohydrolyzing dimethyldichlorosilane with silanes of the type $R'SiCl_3$, $RR'SiCl_2$ and $R_3SiCl$ in such proportions that the resulting copolymer will have a degree of substitution of from 1.9 to 2.1 organic groups per silicon atom. The fluids so obtained are copolymers of dimethylsiloxane and siloxanes of the type $R'SiO_{3/2}$ and $RR'SiO$. Examples of the latter two, which are operative in this invention, are phenylmethylsiloxane, ethylmethylsiloxane, dibutylsiloxane, diphenylsiloxane, tolylmethylsiloxane, chlorophenylmethylsiloxane, dichlorophenylsilsesquioxane and monophenylsilsesquioxane.

Whereas satisfactory blends are obtained which contain no trisubstituted component, it is often desirable to include within the copolymers (2) up to 10 mol percent of such siloxanes. Preferably the trisubstituted component is trimethylsiloxane. The addition of a triorgano substituted component improves the stability of the low viscosity oil.

The high viscosity fluid (1) may be prepared by cohydrolyzing dimethyldichlorosilane with a chlorosilane of the type $RR'SiCl_2$. The latter component should be present in amount from 2 mol percent to 8 mol percent. When percents higher than 8 percent are employed the freezing points of the blends are unduly high. The viscosity of the copolymer may be advanced to above 12,500 cs. by any of the known methods of polymerizing diorganosiloxanes as, for example, that disclosed in U. S. Patent No. 2,432,665. Preferably the copolymer should have two organic radicals per silicon atom.

The component $RR'SiO$ may be, for example, phenylmethylsiloxane, phenylethylsiloxane, chlorophenylmethylsiloxane, tolylmethylsiloxane, diphenylsiloxane, bis-chlorophenylsiloxane, ethylmethylsiloxane and dipropylsiloxane.

The blends of this invention are useful as damping media and lubricants.

All viscosities recited herein are viscosities at 25° C.

The following examples are illustrative only.

Example 1

43 g. of a 78,000 cs. copolymer having a composition of 94 mol percent dimethylsiloxane and 6 mol percent phenylmethylsiloxane and a freezing point of −35.8° C. was mixed with 10 g. of an 88 cs. copolymer having the composition 10 mol percent phenylmethylsiloxane, 85 mol percent dimethylsiloxane and 5 mol percent trimethylsiloxane. The mixture was agitated until a homogeneous blend was obtained. The blend had a viscosity of 32,500 cs. at 25° C. and a freezing point of −56.1° C.

Example 2

42 g. of a 164,000 cs. viscosity copolymeric siloxane having a freezing point of −43.6° C. and a composition of 94 mol percent dimethylsiloxane and 6 mol percent phenylmethylsiloxane was mixed with 22.5 g. of a 70 cs. viscosity fluid having a composition of 85 mol percent dimethylsiloxane, 10 mol percent phenylmethylsiloxane and 5 mol percent trimethylsiloxane. The mixture was agitated until a homogeneous fluid was obtained. The resulting blend had a viscosity of 30,200 cs. at 35° C. and a freezing point of −62.3° C.

Example 3

2020 g. of a copolymeric siloxane having a composition of the high viscosity component of Example 2 and a viscosity of 700,000 cs. was mixed with 500 g. of a 70 cs. copolymeric siloxane and 1400 g. of an 80 cs. copolymeric siloxane, both of the latter having a composition of the low viscosity component of Example 2. The mixture was agitated until a homogeneous blend was obtained. The blend had a viscosity of 32,500 cs. at 25° C. and a freezing point of −58.8° C.

Example 4

88 g. of a 2,000,000 cs. copolymer fluid having a composition of 3 mol percent phenylmethylsiloxane and 97 mol percent dimethylsiloxane was mixed with 75 g. of a 72.6 cs. viscosity copolymer having a composition of 85 mol percent dimethylsiloxane, 10 mol percent phenylmethylsiloxane and 5 mol percent trimethylsiloxane. The mixing was carried out in a colloid mill. The homogeneous blend thereby obtained had a viscosity of 214,000 cs. and a freezing point of −76.6° C.

The viscosity of the blend changed less than 1 percent after 16 hours at 200° C.

Example 5

73.8 g. of the high viscosity copolymer of Example 4 was placed in a colloid mill and blended with 128 g. of a 75.4 cs. copolymeric fluid which was prepared in the following manner.

A mixture of 168 g. of dichlorophenyltrichlorosilane, 1316 g. of dimethyldichlorosilane and 130 g. of trimethylchlorosilane was cohydrolyzed by adding the mixed chlorides to 2072 g. of water. The cohydrolyzate was washed until neutral and then strip distilled at a temperature up to 250° C. at 2 mm. of mercury. The residue was employed in the blend.

The blend of the above 2,000,000 cs. and 75 cs. fluids resulted in a liquid having a viscosity of 20,940 and a freezing point of −80.7° C.

Example 6

355 g. of the high viscosity copolymer of Example 4 was agitated in a colloid mill with 530 g. of a 104 cs. fluid having a composition of 85 mol percent dimethylsiloxane, 10 mol percent chlorophenylmethylsiloxane and 5 mol percent trimethylsiloxane. The homogeneous fluid thereby obtained had a viscosity of 31,040 cs. of a freezing point of −81.7° C.

Example 7

A fluid having a viscosity above 12,500 cs. and a freezing point below −56° C. is obtained when 74 g. of a 2,000,000 cs. copolymer containing 96 mol percent dimethylsiloxane and 4 mol percent of ethylmethylsiloxane, diphenylsiloxane, dibutylsiloxane, or chlorophenyltolylsiloxane is mixed with 128 g. of a 100 cs. viscosity copolymer containing 85 mol percent dimethylsiloxane, 5 mol percent triethylsiloxane, tributylsiloxane or diethylchlorophenylsiloxane and 10 mol percent diethylsiloxane, chlorobutylsilsesquioxane or ethylpropylsiloxane until a homogeneous blend is obtained.

That which is claimed is:

1. A siloxane fluid having a viscosity of at least 12,500 cs. and a freezing point below $-56°$ C. which siloxane is composed of a copolymeric organopolysiloxane (1) having a viscosity of at least 50,000 cs. at 25° C. and a copolymeric siloxane fluid (2) having a viscosity of from 20 cs. to 125 cs. at 25° C., the amount of fluid (2) being at least 18 percent by weight based upon the weight of the total siloxanes and lying to the left of line AB in the accompanying drawing, fluid (1) having a composition of from 92 to 98 mol percent dimethylsiloxane and from 8 to 2 mol percent of a siloxane of the type RR'SiO where R is selected from the group consisting of alkyl radicals of from 1 to 4 carbon atoms and monocyclic aryl radicals and R' is selected from the group consisting of alkyl radicals of from 2 to 4 carbon atoms and monocyclic aryl radicals, the low viscosity fluid (2) having a degree of substitution of from 1.9 to 2.1 organic radicals per silicon atom and a composition of from 80 to 98 mol percent dimethylsiloxane and from 2 to 20 mol percent siloxane units selected from the group consisting of RR'SiO, R'SiO$_{3/2}$ and R$_3$SiO$_{1/2}$, there being at least 2 and not more than 15 mol percent of at least one of the units containing R' and from 0 to 10 mol percent R$_3$SiO$_{1/2}$ units, where R is selected from the group consisting of alkyl radicals of from 1 to 4 carbon atoms and monocyclic aryl radicals and R' is selected from the group consisting of alkyl radicals having from 2 to 4 carbon atoms and monocyclic aryl radicals.

2. The fluid siloxane in accordance with claim 1 in which the high viscosity fluid (1) has a composition of from 92 to 98 mol percent dimethylsiloxane and from 2 to 8 mol percent phenylmethylsiloxane and the low viscosity fluid (2) has the composition of 80 to 98 mol percent dimethylsiloxane, from 2 to 15 mol percent phenylmethylsiloxane and from 0 to 10 mol percent trimethylsiloxane.

3. The siloxane in accordance with claim 1 in which fluid (1) has a composition of from 92 to 98 mol percent dimethylsiloxane and from 2 to 8 mol percent phenylmethylsiloxane and the low viscosity fluid (2) has the composition from 80 to 98 mol percent dimethylsiloxane, and from 2 to 10 mol percent dichlorophenylsilsesquioxane and from 0 to 10 mol percent trimethylsiloxane.

4. A siloxane fluid in accordance with claim 1 in which fluid (1) has a composition of from 92 to 98 mol percent dimethylsiloxane and from 2 to 8 mol percent phenylmethylsiloxane and the low viscosity fluid (2) has the composition from 80 to 98 mol percent dimethylsiloxane, from 2 to 15 mol percent chlorophenylmethylsiloxane and from 0 to 10 mol percent trimethylsiloxane.

MELVIN J. HUNTER.
HERBERT J. FLETCHER.

No references cited.